US006892388B1

(12) United States Patent
Catanoso

(10) Patent No.: US 6,892,388 B1
(45) Date of Patent: May 10, 2005

(54) VIDEO RECORDING AND PRODUCTION SYSTEM

(76) Inventor: David P. Catanoso, 8 Clayton Dr., Seaville, NJ (US) 08230

( * ) Notice: Subject to any disclaimer, the term of this patent is extended or adjusted under 35 U.S.C. 154(b) by 0 days.

(21) Appl. No.: 09/444,356

(22) Filed: Nov. 18, 1999

Related U.S. Application Data

(60) Provisional application No. 60/108,906, filed on Nov. 18, 1998.

(51) Int. Cl.[7] .......................... H04N 7/173; H04N 7/18
(52) U.S. Cl. .................. 725/105; 348/14.11; 348/143
(58) Field of Search .................. 725/105; 348/14.11, 348/143; 709/231; 712/32; 463/20; 361/826; 700/219; 340/539.23; 382/115

(56) References Cited

U.S. PATENT DOCUMENTS

| | | | | |
|---|---|---|---|---|
| 4,873,644 A | * | 10/1989 | Fujii et al. ................. | 700/219 |
| 5,289,280 A | | 2/1994 | Nomura et al. ............. | 348/571 |
| 5,309,144 A | * | 5/1994 | Lacombe et al. ....... | 340/539.23 |
| 5,486,141 A | | 1/1996 | Ohga et al. .................. | 472/60 |
| 5,513,116 A | | 4/1996 | Buckley et al. ............. | 364/479 |
| 5,546,316 A | | 8/1996 | Buckley et al. ........ | 364/479.03 |
| 5,611,730 A | * | 3/1997 | Weiss .......................... | 463/20 |
| 5,655,053 A | | 8/1997 | Renie .......................... | 386/117 |
| 5,682,301 A | * | 10/1997 | Kraft .......................... | 361/826 |
| 5,694,514 A | | 12/1997 | Evans et al. ................. | 386/46 |
| 5,751,885 A | | 5/1998 | O'Loughlin et al. ......... | 386/46 |
| 5,872,887 A | | 2/1999 | Walker ....................... | 386/117 |
| 5,909,589 A | * | 6/1999 | Parker et al. ................. | 712/32 |
| 6,009,470 A | * | 12/1999 | Watkins ...................... | 709/231 |
| 6,046,762 A | * | 4/2000 | Sonesh et al. ............ | 348/14.11 |
| 6,526,158 B1 | * | 2/2003 | Goldberg ..................... | 382/115 |

* cited by examiner

Primary Examiner—Allen Wong
(74) Attorney, Agent, or Firm—Webb Ziesenheim Logsdon Orkin & Hanson, P.C.

(57) ABSTRACT

A system for recording, storing, manipulating, retrieving and displaying video images of events. The system has the capability of accepting video and audio input from a number of sources, processing and storing the input in the digital format, and combining it with previously captured material for the production on demand of video tapes or other media. Manual controls and automated sensors govern the video collection process. Remote monitoring and control is accomplished through networks or modem connections.

19 Claims, 3 Drawing Sheets

VIDEO RECORDING AND PRODUCTION SYSTEM

CROSS-REFERENCE TO RELATED APPLICATION

This application claims the benefit of U.S. Provisional Application Ser. No. 60/108,906 filed Nov. 18, 1998 entitled "Video Recording and Production System".

BACKGROUND OF THE INVENTION

1. Field of the Invention

The present invention is a system for recording, storing, manipulating, retrieving and displaying video images of events.

2. Description of Prior Art

Numerous innovations have been provided in the prior art for video production systems. In many situations, a person participating in an event and wishing to obtain a customized video record of the event can rely on a second person to operate a video camera. Events may include an athletic contest, or a ride on an attraction at an amusement park. However, there are situations in which this procedure is not convenient. If the event requires simultaneous operation and focusing of a camera, it is best depicted from a number of different points of view, or is best depicted from a location that a human observer cannot safely reach, a single operator may not be able to produce an adequate video record.

Systems have been developed that overcome some of these difficulties. Multiple video cameras may be employed so that an event can be captured from various points of view. A centralized video system may be employed to integrate video clips from these cameras.

Though these systems may be suitable for specific individual purposes that they address, a need remains for a video recording and production system capable of rapidly combining video signals or data from a number of sources, recording them in real time by switching among sources of data, collecting the video data in one pass, and recording the data in a single pass. A need also exists for a system that requires no action on the part of a subject for the video recording of an event, but that produces a finished product only on request of the subject.

Additional needs also exist for a video recording and production system that performs censoring functions, provides separate storage for video clips depicting celebrities, and displays customized video clips to the correct participants at a desired location.

SUMMARY OF INVENTION

In order to meet these needs, the present invention is a system for recording, storing, manipulating, retrieving and displaying video images of events. The invention includes a computer designated as the capture workstation devoted to video capture. This computer contains a central processing unit, memory, storage devices, a media control interface card and peripherals, including a monitor. It is equipped with a video capture card, a digital analog converter and a programmable logic control to control video and audio input via switching devices, manual controls and sensors, and a network connection. It is linked to video sources through the video capture card, and linked to a networking hub or switch through the network connection. Another computer, the playback workstation, allows for the manipulation of video images captured by the capture workstation. It contains a central processing unit, memory, storage devices, a media control interface card and peripherals, including a monitor. It is equipped with a video capture card, a modem for remote monitoring and control of the playback workstation, a network connection, and media recording devices for production of video materials, such as video cassettes, CD-ROMs or digital video disks. It is linked to the networking hub or switch through the network connection. The system can accommodate the addition of a CENWS (censor workstation) computer to eliminate entire clips, blur portions of clips, or to mask audio prior to the transmission of the clips to the playback workstation. The system can also accommodate the addition of a DISPWS (display workstation) computer capable of displaying clips to a video monitor such that the proper clip is played for a potential customer.

In the operation of the system, video and audio input is received from at least one camera. Selecting and controlling of video and audio input is accomplished by switches controlled by a programmable logic control unit responding to sensors and manual controls. The resulting video input is stored in databases. Video images corresponding to the video input are retrieved, processed, displayed, and recorded on video media.

DETAILED DESCRIPTION OF THE PREFERRED EMBODIMENT

Figure 1:
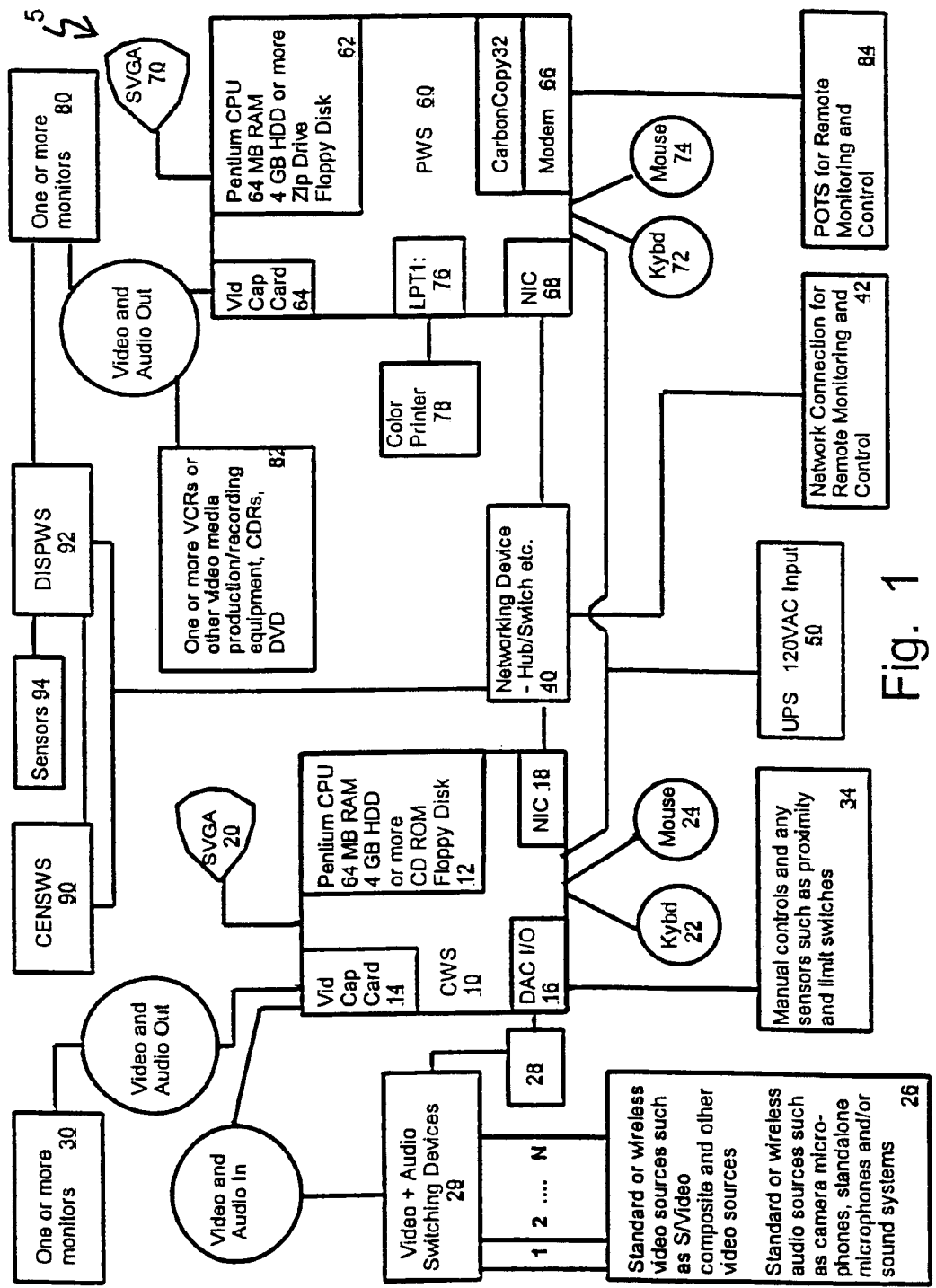
FIG. 1 is a schematic diagram of the video recording and production system.

FIG. 1 illustrates the layout of a video "capture", i.e., recording and production system, according to the invention. Capture workstation 10 is a computer devoted to video capture. It contains a central processing unit, memory, a hard drive, and a CD-ROM disk and floppy disk, and other peripherals represented by 12. It also contains a video capture card 14. A digital analog converter 16 coordinates input and output with manual controls and other sensors located outside of the computer. Network interface card 18 provides a linkage to a network on which one or more computers may be connected for manipulation of data. Monitor 20 is devoted to control of the capture workstation 10. Keyboard 22 and mouse 24 are used for input and control of programs run on the capture workstation 10.

Video sources 26 provide input to the computer in audio and visual form. Programmable logic control (PLC) 28 controls video and audio switches 29 to permit the selection of an audio and video signal from among video sources 26. The switches 29 are driven by PLC 28 in response to signals from manual controls and sensors 34 (via digital analog converter 16). One or more monitors 30 are used for displaying the video signal captured by the capture workstation 10. Manual controls and sensors 34 are used in the video collection process to start or stop video collection and to provide other controls, such as camera focus and camera movement. Sensors may include, for example, proximity and limit switches. Networking device 40 provides connectivity with other computers to which the capture workstation 10 may be connected. Network connection 42 allows computers connected to the network to be operated and controlled in a remote fashion. Uninterruptable power supply 50 provides a constant power supply to the computers connected to the system.

Playback workstation 60 allows for manipulation of video images captured by capture workstation 10. Playback workstation 60 contains processors, memory and storage devices, such as hard drives and floppy disks, represented by 62. Video capture card 64 allows display of video material after it has been manipulated or processed. Modem 66 allows for monitoring and control of the playback workstation 60 in a remote fashion. Network interface card 68 links the playback workstation 60 to the network through hub 40. Monitor 70 is connected to playback workstation 60 and is used to display information involved in system control. Keyboard 72 and mouse 74 allow information to be entered and control to be maintained over playback workstation 60.

One or more monitors 80 are connected to the playback workstation 60 through video capture card 64. These allow for the display of video and other information after it has been manipulated on the playback workstation 60. One or more media recording devices 82 for production of video materials, such as video cassettes, CD-ROMs or digital video disks are connected to the video capture card 64. Controls for remote monitoring 84 are connected through modem 66 to the playback workstation 60. Color printer 78 is connected to playback workstation 60 through a line printer control card 76.

The system can accommodate the addition of a CENWS (censor workstation) 90 to eliminate entire clips, blur portions of clips, or mask audio prior to the transmission of the clips to the playback workstation 60. The CENSW also allows for the storage of celebrity clips separate from the main stream clips for private viewing and output to media without presentation to the general public.

The system can also accommodate the addition of a DISPWS (display workstation) 92 capable of displaying clips to a video monitor such that the proper clip is played for the correct passengers or participants of a ride or attraction at a desired point such as the exit prior to reaching the point of sale. Sensors 94 can be used to control the video monitor display.

The CENWS and the DISPWS use an appropriately modified version of the software used for the playback workstation 60, run on a capture workstation hardware platform.

For low performance applications, both the capture workstation 10 and playback workstation 60, as well as optional CENWS 90 and DISPWS 92, can be housed on a single computer. For more demanding applications, the design of the system is scalable and can be installed on two or more workstations with dedicated servers over a suitable network.

Figure 2:
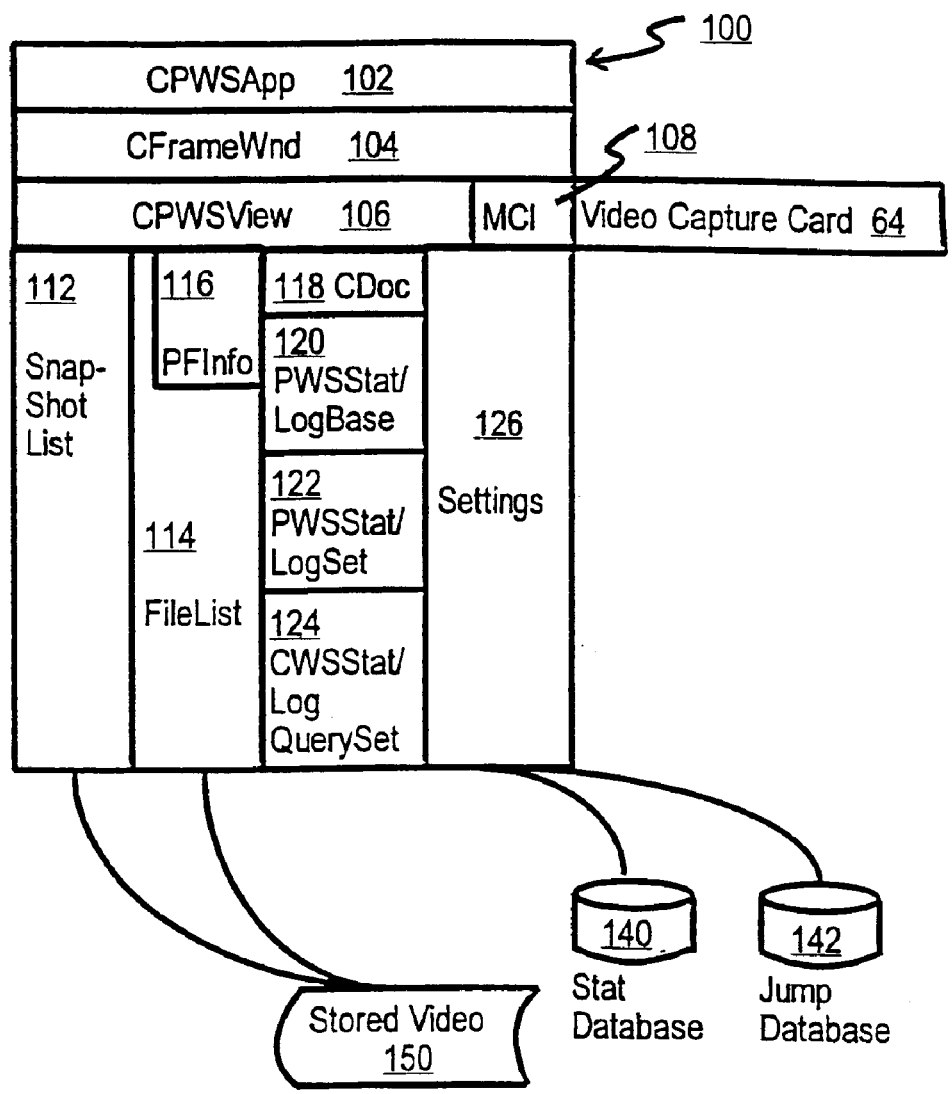
FIG. 2 is a schematic diagram of the software residing in, and the linkages to, the playback workstation.

FIG. 2 represents the software and data stored on the playback workstation 60. Playback workstation 60 makes use of a suite 100 of software routines and data to accomplish video capture operations. The CPWSApp routine 102 coordinates the activities of the entire video playback workstation. The CFrameWindow routine 104 controls the playback workstation user interface, generating the screen display viewed by the PWS operator. The CPWSView routine 106 executes user requests, and operates in conjunction with a media control interface card 108 which allows the decoding and display of video files captured by video capture card 64. SnapShot List 112 and FileList 114 are lists of stills and video sequences stored in the form of stored video 150. The FileList routines 114 name and manage files with video and audio content, and remove old files. Preferably, the FileList routines are written to manage files in the AVI format, a common format for the storage of video and audio material in a tagged and compressed format. A database PFInfo 116 contains information for locating and describing video sequences, and related information. The CDoc routine 118 contains the common code for database logging activity. Specific routines making use of this common code include PWSStat/LogBase 120, PWSStat/LogSet 122, and CWSStat/LogQuerySet 124. These routines handle all database logging activity and are customizable for each application so that information such as ride times, numbers of videos produced, numbers of videos previewed, and the times at which the PWS was in operation can be logged. The Settings routines 126 control the playback of video information in conjunction with view software 106. Information of a statistical nature and database access activity is contained in Stat Database 140 and Log Database 142. Stored Video 150 may be of a single frame or video sequence nature.

Figure 3:
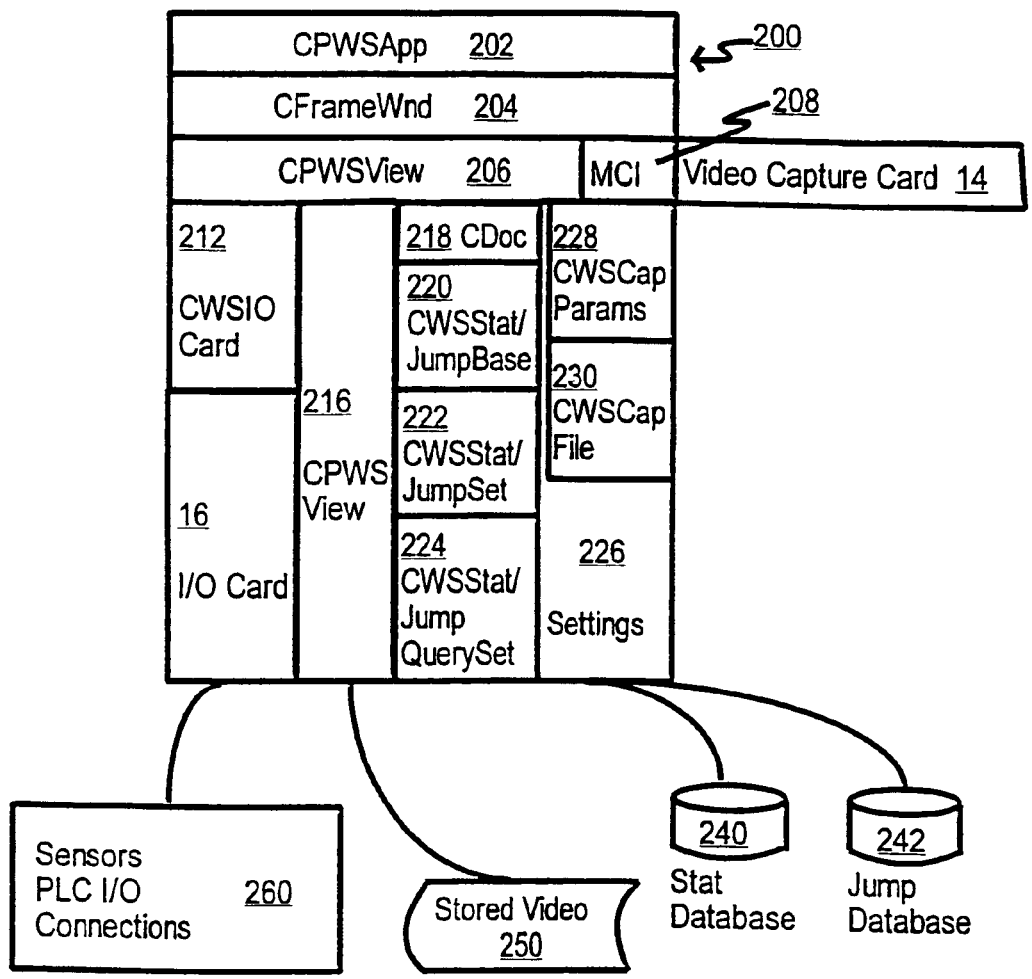
FIG. 3 is a schematic diagram of the software residing in, and the linkages to, the capture workstation.

FIG. 3 depicts the software and data housed on the capture workstation 10. The capture workstation 10 makes use of a suite 200 of software routines and data to accomplish video capture operations. A CPWSApp routine 202 coordinates the activities of the entire video capture workstation. A CFrameWindow routine 204 controls the capture workstation user interface, generating the screen display viewed by the CWS operator. A CPWSView routine 206 executes user requests. It also monitors and reacts to manual controls and sensors 34, and operates in conjunction with a media control interface card 208 which allows the decoding and display of video files captured by video capture card 14. Video capture card 14 is connected to the capture workstation 10 through media control interface card 208. A CWSIOCard 212 sets card parameters for DAC I/O card 16, and, through DAC I/O card 16, controls programmable logic control 28 and video +audio switching devices 29 for the selection of audio and video sources. CWSIOCard 212 and I/O Card 214 respond to sensor signals 260. A component of CPWSView software 216 controls viewing of stored video 250. A CDoc routine 118 contains the common code for database logging activity. Specific routines making use of this common code include CWSStat/JumpBase 220, CWSStat/JumpSet 222, and CWSStat/QuerySet 224. These routines handle all database logging activity and are customizable for each application so that information such as ride times, times at which the CWS was in operation, and the number of rides per day can be logged. Settings 226 control the display of video information. A CWSCapParams routine 228 contains customizable settings for the videocapture procedure, and a CWSCapFile routine 230 performs file handling-functions.

In the operation of the system, one or more video and/or audio sources 26 serve as input to the video capture card 14 in capture workstation 10. The video sources may be standard or wireless video sources such as S-Video/composite and/or other video sources. The audio sources may be standard or wireless audio sources such as camera microphones, standalone microphones and/or sound systems. The operation of the video and/or audio sources can be controlled by manual controls and/or sensors 34 such as proximity sensors or limit switches. These sensors and switches provide signals converted by digital analog converter input/output card 16 which can trigger such tasks as turning cameras on or off, focusing cameras, switching among cameras or aiming cameras. The recording process can be carried out manually or automatically. Programmable logic control 28 is used to control audio and video switches 29 to accomplish switching among video and audio sources. Preferably, switching is accomplished in a manner that produces a single stream of video and audio input to the capture workstation 10 that is processed in real time. Captured video is monitored on one or more monitors 30 as well as the computer screen 20. Video images are stored in digitized form and can be transferred through computer network hub 40 to playback workstation 60. Database information concerning video data, such as the time at which the video images were recorded or the length of a video segment, can be transferred to the playback workstation 60 in a similar fashion.

Playback workstation 60 allows an operator to manage stored video recordings. Stored videos can be displayed on monitors 80 or used to generate video tapes, CD-ROMs, digital video tapes, or other video output 82. All activity is logged to databases such as Stat Database 140 and Log Database 142. Information logged to databases may include the number of purchases or the number of video tapes made. Optionally, the playback workstation 60 can extract single frames of video output; these can be displayed on monitors 80 or sent through a printer port 76 to a color printer 78. The output from the playback workstation 60 may also be used for motion analysis, as in the study of a golf swing or a figure skating routine. The playback workstation 60 can also insert prerecorded video clips at different points of video media 82 for promotional purposes.

The system offers a number of advantages over currently existing systems. Control through sensors allows automated operation. For example, distance sensors may control camera focus, proximity switches may be used to turn the system on and off and triggering devices may allow recording of single events, instead of constantly running the camera(s) and recording equipment. The system also provides ease of transfer of video information as it is transferred from one computer to another in a digitized format. The digital format also results in ease of manipulation of captured images. The use of a computer in the playback workstation allows video information to be recorded on videocassette tapes, CD-ROMs, digital video disks or printed on a color printer. The computer databases expedite retrieval of video sequences and individual frames. The wireless video input option offers ease of connection and permits video information to be obtained from locations where direct connections would constitute obstructions or hazards. Remote monitoring and control through networks and modem connections provides flexibility in the location of the system operator.

It is anticipated the above-described system will be useful for recording events, such as:

individuals on amusement rides
athletic events and/or training
karaoke
security surveillance
scientific research, such as animal behavior study
education and training, such as development of job interview or speaking skills.

The system provides a nearly instantaneous recording (such as a video tape) of the event to provide, for example, an on-the-spot souvenir to an amusement park rider.

In a preferred embodiment, the above-described system is configured to work on a single amusement ride or attraction. It is configured to produce video tapes quickly in a sequence of one-pass recording and one-pass output to media. All recording is done from a single video-audio stream. Camera and audio source changes are accomplished through the use of audio and video switches 29 controlled by programmable logic control (PLC) 28 that interfaces with sensors 34 on the ride and the digital analog converter 16 in capture workstation 10. Use of the combination of programmable logic control 28 and digital analog converter 16 enable the system to be customized to each specific attraction. This feature also enables one capture workstation 10 to record multiple video sources to reduce the amount of hardware required. For example, one capture workstation 10 may record, from different cameras, different cars on a track to generate tapes for different riders or may record different camera angles of the same car. After this single stream is recorded the playback workstation 60 generates a playback stream to a media recording device 82 which can include prerecorded audio and video. The system monitors one or more sensors 34 and programmable logic control 28 and, based on the results, automatically records a video. All riders are recorded; video tapes or other media are produced only when a rider purchases them. No rider intervention is required for recording.

Having described the currently preferred embodiment of the present invention, it is to be understood that the invention may be otherwise embodied within the scope of the appended claims.

What is claimed is:

1. A video production system, comprising:

a first and second video source installed on an amusement ride and electronically linked to a first video capture card, wherein each of the video sources is one of a video camera and a digital camera, and wherein the first and second video sources are configured to output a first and second image, respectively;

a first capture workstation containing the first video capture card, a first media control interface card, a digital analog converter, and an input connection, wherein the input connection is configured to receive signals from sensors in communication with the ride, wherein each sensor is one of (i) a proximity sensor, (ii) a switch, and (iii) a distance sensor;

at least one first monitor, electronically linked to the first media control interface card;

a network hub, electronically linked to the first capture workstation;

a playback workstation, containing a second video capture card and a second media control interface card, the playback workstation being electronically linked to the network hub;

at least one second monitor, electronically linked to the second media control interface card;

at least one device for the production of video materials, electronically linked to said second video capture card;

a first and second switching device interposed between the first and second video sources and the first video capture card, wherein the first and second switching devices correspond to the first and second video sources, respectively;

at least one programmable logic controller interposed between the switching devices and the digital analog converter, wherein the programmable logic controller is responsive to the signals from the sensors for causing one of the first and second switching devices to couple its corresponding video source to the first capture workstation, whereby the first capture workstation receives one of the first and second image;

a storage device for receiving one of the first and second image from the first capture workstation and storing the one of the first and second image in a digitized format; and a database for storing data pertaining to the one of the first and second image.

2. The video production system according to claim 1, further comprising manual controls, electronically linked to the switching devices through the first capture workstation.

3. The video production system according to claim 1, further comprising a modem electronically linked to the playback workstation; and controls for remote monitoring, electronically linked to the modem.

4. The video production system according to claim 1, further comprising a network connection electronically linked to the network hub.

5. The video production system according to claim 1, further comprising a first control monitor, a first keyboard, and a first mouse electronically linked to the first capture workstation; and a second control monitor, a second keyboard and a second mouse electronically linked to the playback workstation.

6. The video production system according to claim 1, further comprising an uninterruptible power supply in electrical communication with the first capture workstation and the playback workstation.

7. The video production system according to claim 1, further comprising a censor workstation electronically linked to the network hub, wherein the censor workstation is configured to one of:

eliminate the entire image;

blur portions of the image; and mask audio corresponding to the image.

8. The video production system according to claim 1, further comprising a display workstation electronically linked to the network hub.

9. The video production system according to claim 1, further comprising a printer electronically linked to the playback workstation.

10. The video production system according to claim 1, wherein the video materials comprise one of still photographs and video sequences.

11. The video production system according to claim 1, wherein the data pertaining to the one of the first and second image comprises at least one of the following:

a time at which each video image was recorded;

the length of a video sequence;

information for locating the video sequence in the playback workstation;

information describing the video sequence;

amusement ride times;

number of amusement rides per day; and point of sale information relating to the video materials.

12. The video production system according to claim 1, further comprising a second capture workstation electronically linked to the network hub, wherein the second capture workstation is configured to receive one of video and audio.

13. The video production system according to claim 1, further comprising an audio source installed on the amusement ride and electronically linked to the first capture workstation, wherein the audio source is a microphone.

14. The video production system according to claim 1, wherein the switch is a limit switch.

15. A process for creating recorded video images of amusement ride activity and storing related information, comprising the steps of:

installing at least one camera on an amusement ride, wherein the camera is one of a video camera and a digital camera, wherein the camera is configured to output a video sequence, further wherein the camera is electronically connected to a capture workstation, and wherein the capture workstation connection is configured to receive a signal from a sensor in communication with the ride, wherein the sensor one of (i) a proximity sensor, (ii) a switch, and (iii) a distance sensor;

capturing the video sequence, wherein the video sequence is of at least one individual on the ride;

transmitting wirelessly the video sequence from the camera to the capture workstation in response to the capture workstation receiving the signal from the sensor;

storing the video sequence in digital form;

displaying the video sequence on a playback workstation;

copying onto a physical medium at least one image from said video sequence; and storing information pertaining to the captured video sequence in a database, wherein the information is selected from the group consisting of:

a time at which each video sequence was captured;

the length of the video sequence;

information for locating the video sequence in the playback workstation;

information describing the video sequence;

amusement ride times: number of amusement rides per day; and point of sale information relating to the physical medium.

16. The process of claim 15, wherein the copying onto a physical medium is one of (i) recording onto a video cassette, (ii) recording onto a CD-ROM, (iii) recording onto a digital video disc, and (iv) printing onto photo paper.

17. The process of claim 15, further comprising the step of transmitting at least one video sequence from the capture workstation to a computer network switching device.

18. The process of claim 15, further comprising the step of inserting prerecorded video clips on the physical medium.

19. The process of claim 15, further comprising the step of censoring the video sequence, whereby the video sequence is one of eliminated and blurred.

* * * * *

UNITED STATES PATENT AND TRADEMARK OFFICE
CERTIFICATE OF CORRECTION

PATENT NO. : 6,892,388 B1
DATED : May 10, 2005
INVENTOR(S) : Catanoso

It is certified that error appears in the above-identified patent and that said Letters Patent is hereby corrected as shown below:

<u>Column 8,</u>
Line 17, "sensor one of" should read -- sensor is one of --.

Signed and Sealed this

Twentieth Day of September, 2005

JON W. DUDAS
*Director of the United States Patent and Trademark Office*